(12) United States Patent
Chen

(10) Patent No.: US 6,953,300 B2
(45) Date of Patent: Oct. 11, 2005

(54) COMBINING DEVICE FOR SUSPENDING OBJECT

(76) Inventor: Ted Chen, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/751,067

(22) Filed: Jan. 5, 2004

(65) Prior Publication Data

US 2005/0147483 A1 Jul. 7, 2005

(51) Int. Cl.[7] ............................................. F16B 12/36
(52) U.S. Cl. ............................ 403/292; 403/DIG. 11; 403/DIG. 13; 403/294
(58) Field of Search ............. 411/338–339, 80.1–80.6, 411/71–72, 74, 508–510, 351, 455, 36–38, 411/107, 445, 516, 520–521, 525–526, 528–529; 403/292, 294, 297, DIG. 13, DIG. 11

(56) References Cited

U.S. PATENT DOCUMENTS

| | | | | |
|---|---|---|---|---|
| 573,970 A | * | 12/1896 | Gartside | 164/249 |
| 1,056,452 A | * | 3/1913 | Remhilt | 411/338 |
| 1,374,713 A | * | 4/1921 | Bell | 411/338 |
| 2,100,873 A | * | 11/1937 | Roberts | 411/58 |
| 2,279,955 A | * | 4/1942 | Sipe | 403/277 |
| 2,279,956 A | * | 4/1942 | Sipe | 403/282 |
| 2,384,918 A | * | 9/1945 | Houk | 411/548 |
| 2,470,924 A | * | 5/1949 | Flogaus | 411/80.6 |
| 3,115,804 A | * | 12/1963 | Johnson | 411/338 |
| 3,227,030 A | * | 1/1966 | Preziosi et al. | 411/521 |
| 3,349,649 A | * | 10/1967 | Mele | 408/241 R |
| 3,736,834 A | * | 6/1973 | MacDonald | 411/351 |
| 3,883,258 A | * | 5/1975 | Hewson | 403/298 |
| 4,327,947 A | * | 5/1982 | Bower, Jr. | 299/107 |
| 4,341,487 A | * | 7/1982 | Nemecek | 403/297 |
| 4,449,877 A | * | 5/1984 | Kessler | 411/80.5 |
| 4,681,477 A | * | 7/1987 | Fischer | 403/298 |
| 4,830,536 A | * | 5/1989 | Birch et al. | 405/153 |
| 5,131,783 A | * | 7/1992 | Astl | 403/298 |
| 5,782,918 A | * | 7/1998 | Klardie et al. | 606/60 |
| 6,176,662 B1 | * | 1/2001 | Champney et al. | 411/171 |
| 6,394,806 B1 | * | 5/2002 | Kumar | 433/173 |
| 6,517,543 B1 | * | 2/2003 | Berrevoets et al. | 606/73 |
| 6,561,846 B2 | * | 5/2003 | D'Addario | 439/540.1 |

* cited by examiner

Primary Examiner—Robert J. Sandy
Assistant Examiner—Jeffrey A. Sharp

(57) ABSTRACT

A combining device capable of being embedded into an object comprises: an embedding unit having a first end to be embedded into an embedded object and a second end having an elastic buckling means; a hollow coupling unit having an inner surface which is formed as a channel; wherein in assembly, the second end of the embedding unit is combined with a load and then the elastic buckling means is inserted into the channel of the hollow coupling unit so that the embedding unit is tightly engaged with the hollow coupling unit; and the first end is received in the embedded object so that the embedded object loading the weight of the load.

3 Claims, 3 Drawing Sheets

COMBINING DEVICE FOR SUSPENDING OBJECT

FIELD OF THE INVENTION

The present invention relates to retaining devices, and particular to a combining device capable of being embedded into an object. The combining device mainly includes an embedding unit capable of embedding into a retaining side and a hollow coupling unit. A heavy object can be suspended between the embedding unit and the hollow coupling unit.

BACKGROUND OF THE INVENTION

In the prior art, if it is desired to suspend a heavy object on a wall, in general, a hammer serves to nail nails to the wall. Then the heavy objects are suspended on the wall. In another prior art, holes are drilled on the wall first, then sleeves are embedded into the wall. Then steel nails or threaded nails are nailed into the sleeves for suspending heavy objects. Theses methods are generally used in lamps, ceiling lamps, suspending fans, cabinets, etc.

These conventional ways for suspending or retaining heavy objects have the following defects. First, it is often that many places are not allowed to nail nails or the places are difficult in work. The process of nailing will hurt the worker. The mails cannot be embedded deeply so that the supporting force is insufficient. It is difficult to detach the nails or as the nails are detached, the surface of the wall is destroyed.

SUMMARY OF THE INVENTION

Accordingly, the primary object of the present invention is to provide a separable auxiliary device of a milk absorber, wherein the combining device mainly includes an embedding unit capable of embedding into a retaining side and a hollow coupling unit. A heavy object can be suspended between the embedding unit and the hollow coupling unit.

To achieve above objects, the present invention provides a combining device capable of being embedded into an object comprising: an embedding unit having a first end to be embedded into an embedded object and a second end having an elastic buckling means; a hollow coupling unit having an inner surface which is formed as a channel; wherein in assembly, the second end of the embedding unit is combined with a load and then the elastic buckling means is inserted into the channel of the hollow coupling unit so that the embedding unit is tightly engaged with the hollow coupling unit; and the first end is received in the embedded object so that the embedded object bears the weight of the load.

The combining unit device capable of being embedded into an object further comprises a sliding sleeve for enclosing the second end of the embedding unit for reducing the friction force between the embedding unit and the hollow coupling unit as the second end of the embedding unit is received in the hollow coupling unit.

An outer surface of the first end of the embedding unit is formed with a plurality of tapered rings; each tapered ring has a plane portion vertically to the outer surface of the first end, an annular surface parallel to the bottom thereof and a tapered surface extends from the annular surface to the outer surface of the first end; a narrow part of the tapered ring is further away from the second end than the bottom thereof; wherein in combining, annular surface of each tapered ring tightly engages to the embedded object for providing a reactive force to support an heavy object.

The second end comprises biforked elastic buckling posts which are arranged oppositely; a front end of each buckling post has a hook; when the embedding unit is inserted into the hollow coupling unit; the hook of the buckling post will be buckled in the channel of the hollow coupling unit.

Furthermore, in another application of the present invention, the second end is formed by four elastic buckling posts which are arranged oppositely; a front end of each buckling post has a hook; when the embedding unit is inserted into the hollow coupling unit; the hook of the buckling post will be buckled in the channel of the hollow coupling unit.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
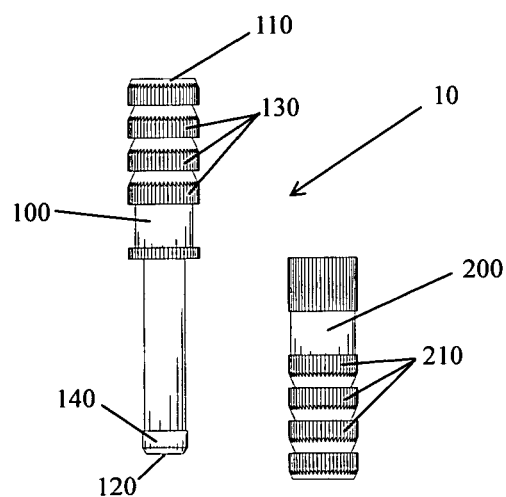
FIG. 1 is a front view of the preferred embodiment of the present invention.

With reference to FIG. 1, a front view of a preferred embodiment of the present invention is illustrated. The combining device of the present invention includes an embedding unit 100, a hollow coupling unit 200, a first end 110 at one end of the embedding unit 100; a second end 120 at an another end of the embedding unit 100; at least one first tapered ring 130 along an outer surface of the embedding unit 100 for enhancing the retaining force as the embedding unit 100 is retained (in the drawing, several rings 130 are illustrated); an elastic buckling means 140 protruded from the embedding unit 100 for buckling with the hollow coupling unit 200; and at least one reversed tapered rings 210 along an outer surface of the hollow coupling unit 200 for suspending a heavy object on the hollow coupling unit 200.

Figure 2:
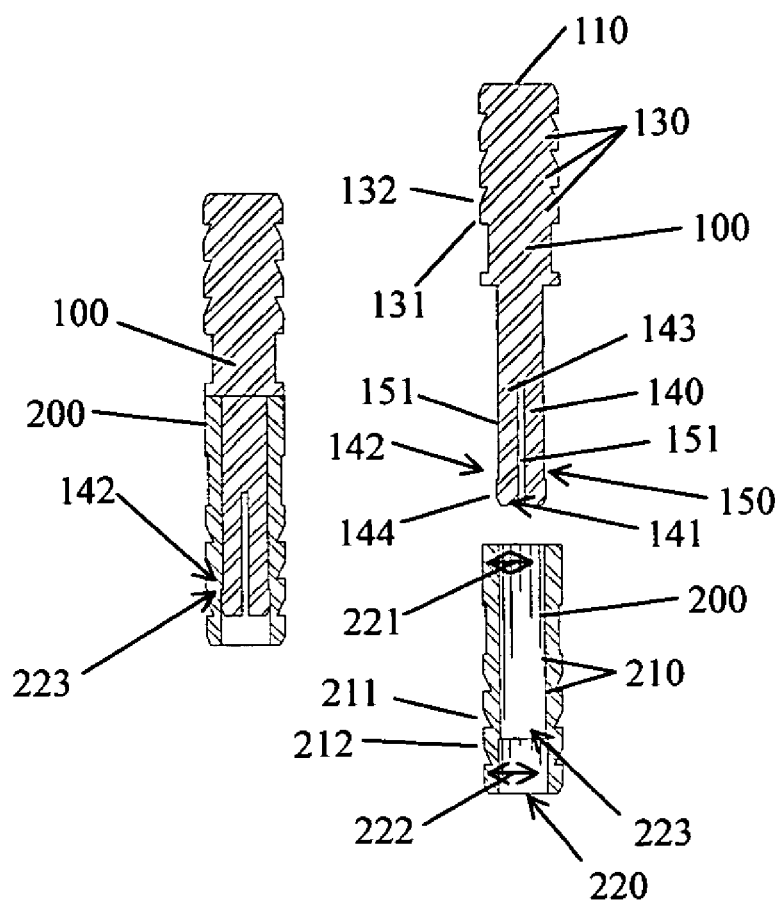
FIG. 2 is an exploded perspective view and an assembled cross section view of the present invention.

With reference to FIG. 2, in this drawings, elements having same functions and arrangement are numerated with same numbers. The at least one tapered rings 130 are around the embedding unit 100. In the cross section view of FIG. 2, each tapered ring is formed as a bottom end of an isosceles triangular. A bottom end of each isosceles triangular as the plane 131 is vertically connected to the axis of the embedding unit 100. The plane 131 is adjacent to an inclined surface 142. Therefore, when the embedding unit 100 is installed to a furniture, a wall or any object capable of receiving the embedding unit 100, the tapered rings 30 resist against the furniture, wall or the object by the plane 131 so as to provide an reactive force to support the heavy object. The second end 120 of the embedding unit 100 has the elastic buckling means 140. In FIG. 2, the elastic buckling means 140 is formed as a biforked buckling means 150 which includes two buckling posts 151 having the same form, but having different elastic orientations. In practical, a front end 141 of the elastic buckling means 140 has a larger diameter so as to form an elastic hook 142, and a vertical recess 143 is formed to cut across the cross section of the elastic buckling means 140, while the opening of the vertical recess 143 is at the elastic hook 142. An outer corner 144 of the front end 141 is chamfered, and the two buckling posts 151 can expand outwards.

The outer surface of the hollow coupling unit 200 has reverse tapered rings 210. Each tapered ring 210 is symmetrical at two sides and has a tapered isosceles triangular shape. Each ring 210 includes a plane 211 and an adjacent inclined surface 212. The orientation of the inclined surface 212 is reverse to that of the inclined surface 142 of the tapered ring 130 of the embedding unit 100. Thereby, objects can be easily suspended from the plane 211 of the tapered ring 210. A center of the hollow coupling unit 200 is formed with a channel 220. The channel 220 is formed by a first channel 221 and a second channel 222. The elastic buckling means 140 (including the front end 141) fits exactly into the first channel 221. The second channel 222 of the channel 220 is slightly wider than the first channel 221. The first channel 221 is communicated to the second channel 222. The connection of the of the first channel 221 and the second channel 222 is formed with a rectangular buckle 223 corresponding to the elastic hook 142 of the front end 141 of the elastic buckling means 140. When the elastic buckling means 140 is pushed to resist against the rectangular buckle 223, the buckling posts 151 will be released so as to expand outwards. Then the hook 142 will be pushed and then buckled to the buckle 223.

Figure 3B:
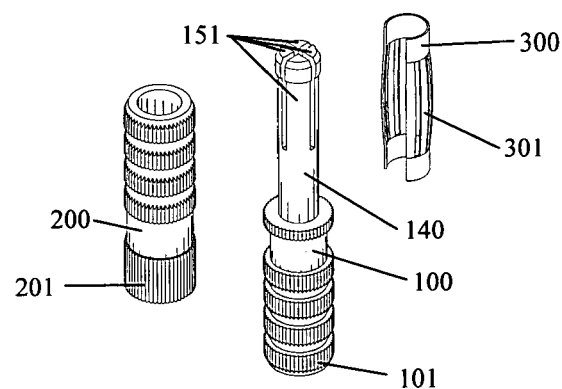
FIGS. 3a and 3b are schematic view of two preferred embodiments of the present invention.
Figure 4:
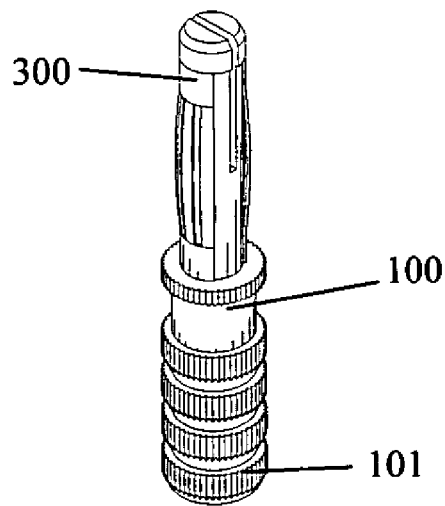
FIG. 4 is a schematic perspective view showing one preferred embodiment, where an embedding unit is enclosed by a sliding sleeve.
Figure 3A:
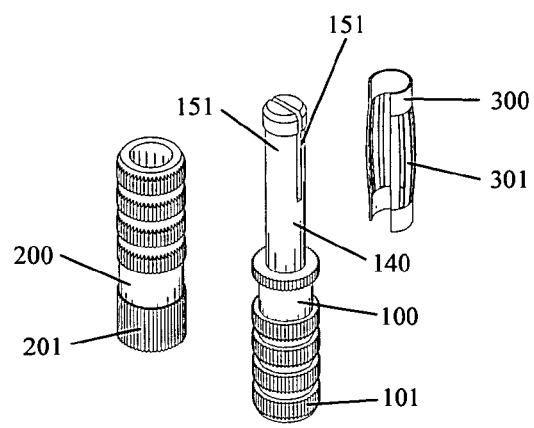

FIGS. 3a, 3b and 4, a sliding sleeve 300 is capable of enclosing the elastic buckling means 140 of the embedding unit 100. A middle section of the sliding sleeve 300 has a plurality of longitudinal outer cambered strips. Preferably, the sliding sleeve 300 is made of metal and is slightly elastic for enclosing the elastic buckling means 140. The strips 301 are concave outwards. When the sliding sleeve 300 encloses the elastic buckling means 140, the strips are concave outwards (referring to FIG. 4) so that when the embedding unit 100 inserts into the hollow coupling unit 200, the sliding sleeve 300 and the strips 301 have the effect of reducing the friction force between the embedding unit 100 and the hollow coupling unit 200 and increase the tightness therebetween. With reference to FIG. 3a, the elastic buckling means 140 of the embedding unit 100 is a biforked buckling means with two buckling posts 151, while in FIG. 3b, elastic buckling means 140 is divided into four parts. The outer surfaces of the embedding unit 100 and the hollow coupling unit 200 are installed with a plurality of indentations 101, 201 which can increase the contact area and the friction force of the embedding unit 100 and hollow coupling unit 200.

Figure 5C:
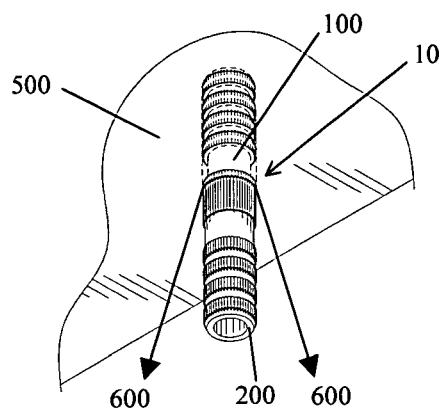
FIGS. 5a to 5c are schematic perspective view showing that the present invention is installed to a furniture, and the embedding unit is buckled to a hollow coupling unit.
Figure 5A:
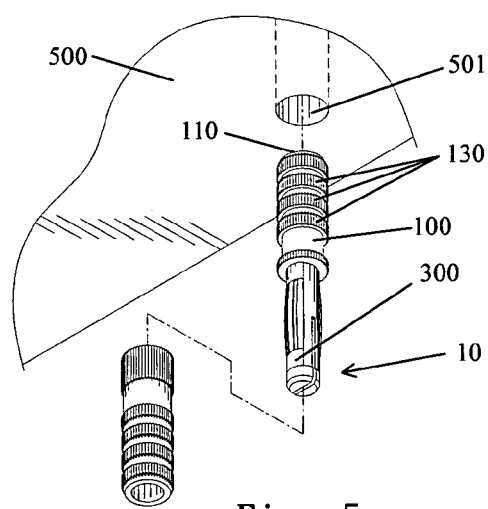

With reference to FIGS. 5a and 5c, in these drawings, the same elements like the former examples are numerated with the same numbers. FIG. 5a shows one furniture 500 for receiving the embedding unit 100 of the present invention. The furniture 500 has an opening 501. In assembling the combining unit 10, the sliding sleeve 300 encloses the embedding unit 100 (referring to FIG. 4), then the first end 110 of the embedding unit 100 having the tapered rings 130 are aligned to the opening 501 of the furniture 500.

Figure 5B:
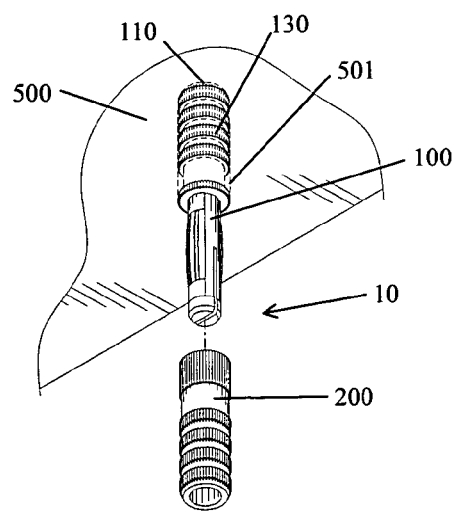

In FIG. 5b, the first end 110 of the embedding unit 100 having the tapered ring 130 inserts into the opening 501 of the embedded object 500 by any way, for example, gluing. The embedding unit 100 is combined with the embedded object 500. Thereby, the assembly of the combining unit 10 is complete. Then the hollow coupling unit 200 inserts into the embedding unit 100.

FIG. 5c, the combining unit 10 can be loaded with a heavy object 600. The hollow coupling unit 200 is tightly combined with the embedding unit 100. The heavy object is clamped so that the weight of the heavy object is supported by the embedded object 500.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A combining device capable of being embedded into an object comprising:

an embedding unit having an axis, a first end to be embedded into said object, and a second end having a means for elastic buckling which permits a radial displacement of said second end;

a tubular hollow coupling unit having an inner surface and an enlarged internal diameter portion which forms a channel;

and a sliding sleeve for surrounding the second end of the embedding unit to reduce friction between the embedding unit and the hollow coupling unit as the second end of the embedding unit is received in the hollow coupling unit;

wherein in assembly, an axial load is applied to the second end of the embedding unit causing the means for elastic buckling to communicate with the channel of the hollow coupling unit; the embedding unit is tightly engaged with the hollow coupling unit; and the first end is axially received in the embedded object so that the object bears said axial load;

wherein a middle section of the sliding sleeve has a plurality of longitudinal outwardly bowed strips; the sliding sleeve is made of metal and is slightly elastic for encasing the second end; and the strips are convex and configured to facilitate insertion of the embedding unit into the hollow coupling unit;

wherein an outer surface of the first end of the embedding unit is formed with a plurality of tapered rings; each tapered ring has an annular flange portion extending radially outwardly, a cylindrical portion concentric with said axis, and an annular tapered surface extending from said annular surface to the outer surface of the first end such that the tapered rings generally converge toward the object;

wherein in joining the embedding unit and object, an external surface of each tapered ring is adapted to tightly engage the object for providing a reactive force to support the object.

2. The combining device capable of being embedded into an object as claimed in claim 1, wherein said means for elastic buckling on said second end comprises biforked elastic buckling posts, which are diametrically opposed; a front end of each buckling post has a hook so that when the embedding unit is inserted into the hollow coupling unit, the hooks of the buckling posts buckle into the channel of the hollow coupling unit.

3. The combining device capable of being embedded into an object as claimed in claim 1, wherein said means for elastic buckling on said second end comprises four elastic buckling posts, which are circumferentially arranged; a front end of each buckling post has a hook so that when the embedding unit is inserted into the hollow coupling unit, the hooks of the buckling posts buckle into the channel of the hollow coupling unit.

* * * * *